Sept. 1, 1964 P. D. OWEN 3,146,554
TOOL GRINDING ATTACHMENT
Filed Sept. 14, 1962 3 Sheets-Sheet 1

INVENTOR.
PAUL D. OWEN
BY David Rabin
ATTORNEY

Sept. 1, 1964        P. D. OWEN        3,146,554

TOOL GRINDING ATTACHMENT

Filed Sept. 14, 1962        3 Sheets-Sheet 2

INVENTOR.
PAUL D. OWEN
BY
*David Rabin*
ATTORNEY

INVENTOR.
PAUL D. OWEN

United States Patent Office 3,146,554
Patented Sept. 1, 1964

3,146,554
TOOL GRINDING ATTACHMENT
Paul D. Owen, 506 Houston St., Greensboro, N.C.
Filed Sept. 14, 1962, Ser. No. 223,619
8 Claims. (Cl. 51—123)

This invention relates to tool grinding attachments and relates more particularly to a tool grinding attachment that may be mounted on a reciprocable table or bed adjacent to a rotatable grinding wheel for sharpening end mills, drill bits, reamers, among other tools.

Normally after prolonged use end mills, fluted reamers, drill bits, among other tools, are discarded as the cost of sharpening or grinding such tools is prohibitive as compared to the cost of replacing such tools. These tools are usually made from high speed steel and in some instances have carbide tips resulting in high costs of replacement. This substantial expenditure for tool replacement in small as well as large machining operations is a substantial factor in machining operations.

Although it is conventional machine shop practice to sharpen end mills, the tips of drills and the cutting edges of other tools by grinding them usually against a motor-driven grinding wheel having suitable abrasive constituents, the grinding is usually accomplished without the aid of any accurate tool supporting member and frequently the life and cutting properties of the tool are appreciably reduced due to the inaccurate sharpening operations.

It is, therefore, a primary objective of this invention to provide an apparatus for supporting various tools for sharpening or grinding in which the tool may be rotated and reciprocated to generate the desired angle or pitch at the required rate of feed corresponding to the tool to be sharpened against a tool grinding wheel.

Another objective of this invention is to provide an attachment mountable on a horizontally reciprocatable table for presenting a tool bit to a revolving grinding wheel at the desired rate of feed and angle of rotation to sharpen the desired cutting edges or surfaces of the tool.

Still another objective of this invention is to provide a tool grinding attachment for supporting end mills, fluted reamers, as well as other tool bits, and present them to a revolving grinding wheel at the desired generated angle upon feeding or advancing the tool grinding attachment at the desired angle of presentation to the grinding wheel and feeding the tool bit at the predetermined or preselected rate of rotation corresponding to the configuration of the tool bit to be sharpened.

Still a further objective of this invention is to provide a tool bit sharpening attachment for presenting a tool bit to a grinding wheel in which the tool may be indexed at the desired angle and presented to the grinding wheel at the desired angle of rotation and pitch corresponding to the tool.

Yet another objective of this invention is to provide an apparatus for supporting a tool for sharpening and presenting the tool to a motor-driven grinding wheel upon reciprocation of the apparatus by controlling the angle of tool rotation corresponding to the helix or pitch of the tool in order to sharpen the cutting edges thereof.

Other objects and many of the attendant advantages of this apparatus for grinding tools will become more readily apparent to those skilled in the machine tool and grinding technology from the following detailed description taken in conjunction with the accompanying drawings in which like characters of reference designate corresponding parts throughout the several views, and wherein.

Figures 1, 5, 6:
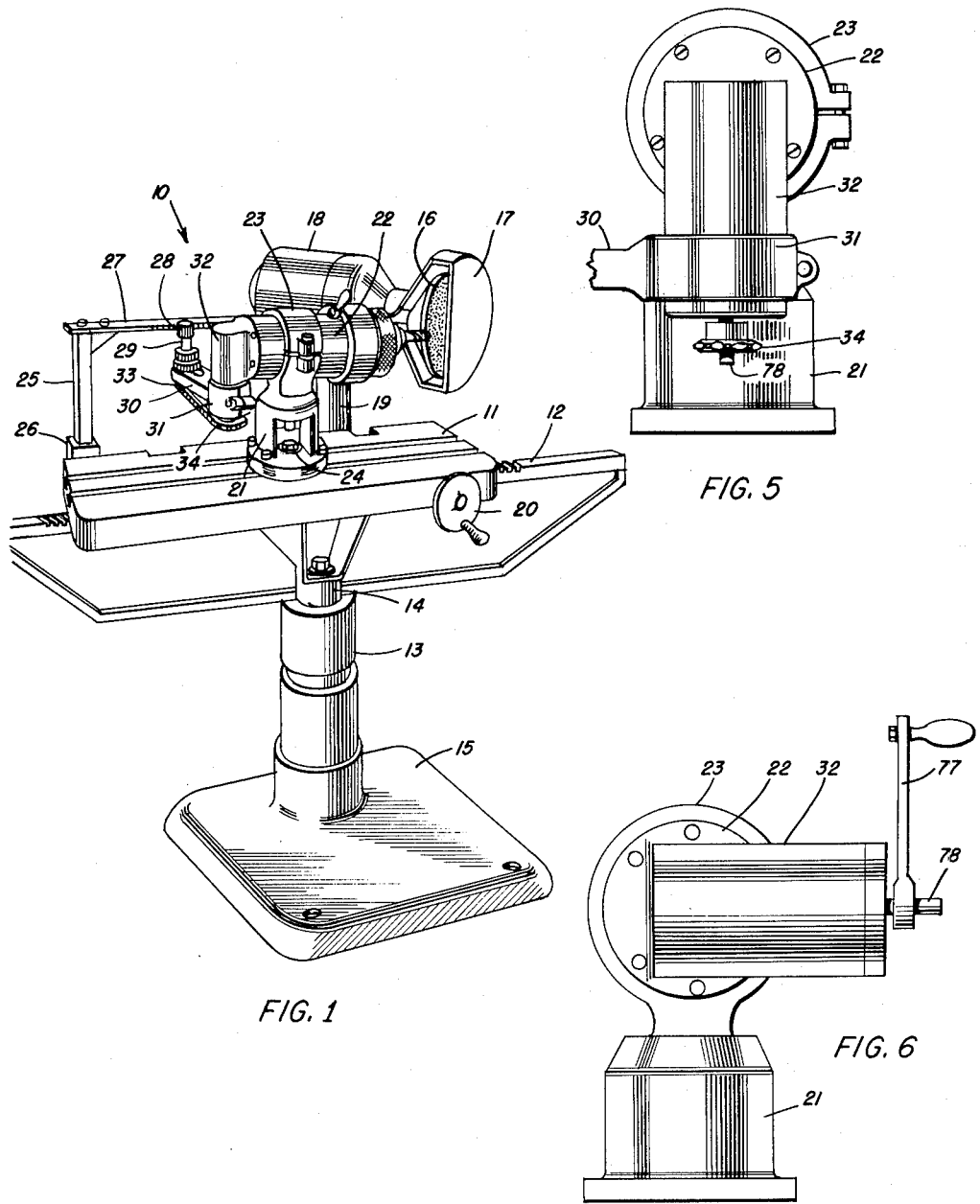
FIG. 1 is a front elevational and perspective view of a tool grinding apparatus and table combination on which the tool supporting grinder attachment embodying this invention is mounted for horizontal reciprocation.
FIG. 5 is an enlarged partial left end elevational view of the tool supporting grinder attachment of FIG. 1.
FIG. 6 is a view similar to FIG. 5 in which the tool supporting grinder housing is rotated 90 degrees and a crank handle is mounted on one end of the rotatable spindle.

Referring to the drawings and more particularly to FIG. 1, there is illustrated the tool grinding attachment 10, embodying one modification of this invention, mounted on a horizontally reciprocable table 11 supported on and movable along a rail 12 of a conventional-type knife-grinder table in which the rail 12 is supported on the column 13 through the vertically slidable shaft 14. The column 13 is mounted on the base or pedestal 15. The motor-driven grinding wheel 16, provided with a suitable guard 17, is supported on a shaft of the motor 18 that is suitably mounted on a motor-supporting bracket 19 that extends from the stationary rail 12. The motor-mounted grinding wheel 17 and motor 18 may be positioned at the requisite angle and elevation with respect to the tool to be sharpened or ground. The horizontally movable table and mounting for the grinding wheel is of the type manufactured and sold by Newman Machine Company of Greensboro, North Carolina.

The table 11 is linearly movable horizontally along the rail 12 by rotation of the crank handle 20. A vertical stanchion or pedestal 21 is bolted securely to the table 11 that may be provided with suitable recesses for supporting the housing 22 of the tool grinding apparatus. The collar 23 mounted on the pedestal 21 securely retains the housing in position at the desired angle. Selected angles for grinding the tool bit may be achieved by rotating the pedestal 21 after the securing bolt 24 is loosened.

A rack-supporting beam 25 is stationarily mounted through a suitable bracket 26 on the rail 12 for supporting the horizontally extending rack 27 for driving the mating pinion gear 28 that is mounted on the shaft 29 which shaft is rotatably supported on the arm 30 extending from and supported by the housing 22. The hub 31 of the arm is releasably clamped to the vertically extending sleeve 32 on the housing 22 and positioned at the desired angle corresponding to the pinion gear 28 that will produce the desired generated path of travel of the tool surface to be ground upon table reciprocation. Obviously, the grinding wheel will be disposed in juxtaposition to the tool to be ground in order to present the grinding surface to the tool surface to be ground.

The lower terminal end of shaft 29 is provided with a sprocket (not shown) around which the chain 33 meshes to transmit rotation to the sprocket 34 on which the chain is mounted thereby driving a shaft which in turn drives the spindle (not shown in FIG. 1) that ultimately revolves the tool to be ground.

Figure 2:
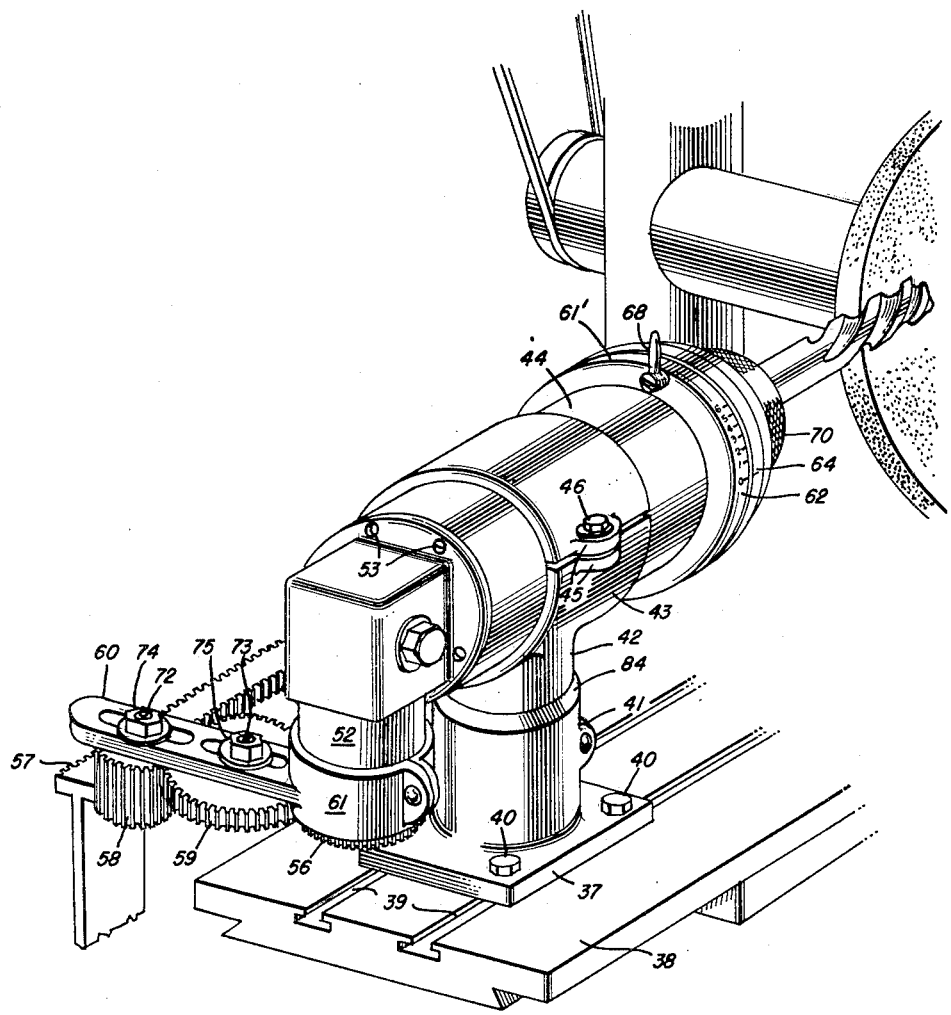
FIG. 2 is a somewhat enlarged perspective view of a modified tool supporting apparatus embodying a modification of that shown in FIG. 1.
Figure 3:
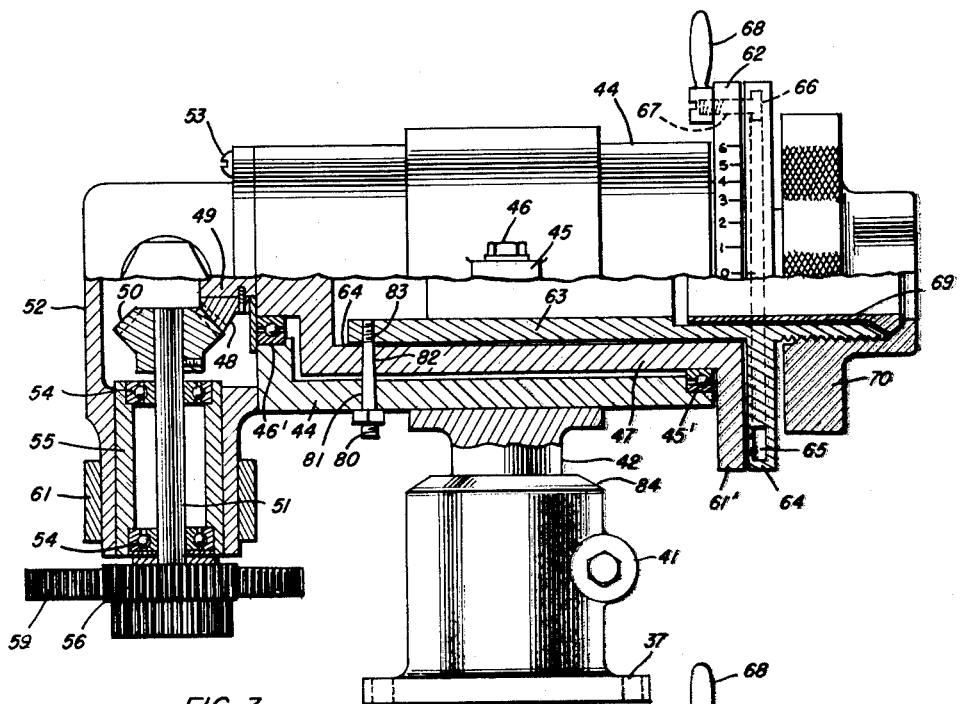
FIG. 3 is a front elevational and partial transverse sectional view of the modified tool supporting grinder attachment of FIG. 2.
Figure 4:
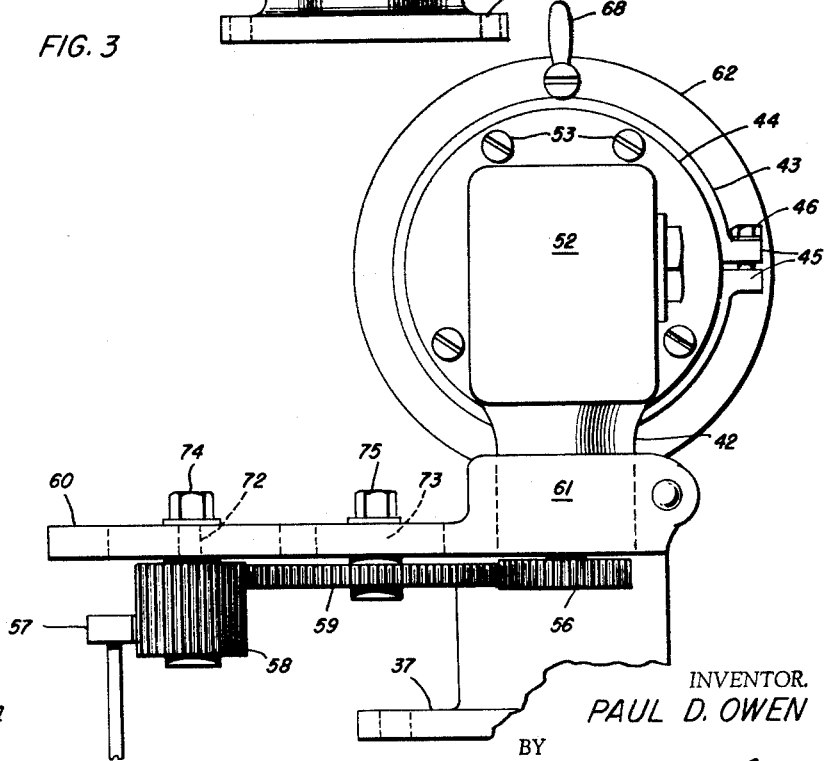
FIG. 4 is a left end elevational view of FIG. 3.

A modified version of the invention is shown in more detail in FIGS. 2, 3 and 4 wherein the apparatus for supporting the tool to be ground is mounted on the socket stanchion 37 that is bolted in the table 38 through the longitudinally extending ways or recesses 39 through the bolts 40. The socket or hub of the stanchion 37 is split vertically and a pair of bolt receiving lugs 41 are provided for releasably clamping the housing supporting column 42 therein. The housing supporting collar 43 releasably clamps the apparatus housing 44 through the projecting lugs 45 and bolt 46. The cylindrical housing 44 is provided with a forward bearing 45' and a rear bearing 46' for rotatably receiving the hollow spindle or shaft 47. A mitered gear 48 is keyed to the one terminal end 49 of the spindle 47 for meshing action with mitered gear 50 mounted on the jack shaft 51 that is rotatably supported in the auxiliary housing 52 mounted at the rear end of the housing 44 through the bolts 53. Bearings 54 are vertically spaced apart on the shaft 51 and support the shaft during rotation in the block 55 within the auxiliary housing. A jack shaft mounted driving gear 56 is keyed to the other end of the shaft 51 and forms the driven gear in the gear train constituted by the rack 57, the pinion gear 58 and the intermediate gear 59. It will be readily apparent that the pinion gear 58 and intermediate gear 59 mounted on the horizontally extending arm 60 that is releasably clamped at the hub 61 to the auxiliary housing 52 may be rotated to the desired angle for accommodating gears of different sizes for translating the desired angular movement to the shaft 51 and ultimately to the spindle 49 through the mitered gears 48 and 50. The spindle 47 is provided at its forward end with a radially projecting flange or collar 61' on which suitable indicia may be inscribed on the circumferential surface 62 thereof. A collet receiving sleeve 63 is cooperatively and concentrically received in the cylindrical cavity 64 of the spindle. Sleeve 63 is provided with an annular collar 64 that cooperates with the collar 61 and is adjacent thereto. Relative rotation between the spindle 47 and sleeve 63 may be achieved in the unlocked or unclamped condition. A circumferential recess 65 is provided in the collar 64 for cooperatively receiving a bolt 66 therein which extends into the opening 67 provided in the collar 61' for threaded engagement with the lever 68 that releasably clamps the collars together for preventing relative movement between the collars 61' and 64, and the spindle 47 and sleeve 63. In the clamped condition, the spindle and sleeve rotate together upon driving engagement with the shaft 51 upon reciprocation of the table 38 that is mounted for horizontal reciprocation substantially in the same manner as that shown in FIG. 1. The sleeve 63 cooperatively receives therein a collet-chuck 69 of conventional construction and a knurled collet-chuck clamping ring 70 that releasably locks a tool bit receivable in the longitudinal recess of the collet-chuck 69.

Depending upon the type of tool to be ground or sharpened, and the number of flutes, whether helical or straight, the collar 64 may be indexed in the unclamped condition by revolving the collar 64 relative to the collar 61 to present another surface to be ground depending upon the pitch or number of flutes on the particular tool.

It will be readily apparent that end mills, reamers, slab mills, router bits, whether having helical flutes or straight flutes, may be ground or sharpened by employing this apparatus and by rotating or orienting the housing at the desired horizontal angle in the stanchion as well as orienting the grinding wheel to the proper position with respect to the tool to be ground.

Selection of the proper gear train corresponding to the pitch or path of surface to be ground on the tool may readily be determined depending upon the generated path of travel desired upon reciprocation of the table on which the apparatus is mounted. Obviously, the pinion and intermediate gears 58 and 59 that are rotatable on their shafts 72 and 73, respectively, may be interchanged with other gears for the desired generated path of travel simply by unscrewing the threaded nuts 74 from shaft 72 and nut 75 from shaft 73 and replacing the gears 58 and 59 with other mating gears for the desired gear train. In the embodiment shown in FIG. 1 wherein the chain 33 is employed, it will not be necessary to interchange the gears of the gear train but simply to modify the angle of the arm 30 upon substitution of another pinion gear in the place of the gear 28 to obtain the desired generated path of travel for the tool bit.

Depening upon the type tool bit being ground, the apparatus lends itself readily to specialized applications by disconnecting the apparatus from the rack engagement and upon loosening the bolt 46 in the collar 43, the housing 44 may be rotated 90 degrees from the position shown in FIG. 5 to that shown in FIG. 6. By removal of the arm 30 and the sprocket wheel 34, a crank handle 77 may be keyed to the end of shaft 78, corresponding to shaft 51, to revolve the spindle and sleeve 63, manually or continuously by motor without generating a path of travel depending upon reciprocation of the table.

It is desirable, particularly for forming straight punches having regular polygonal cross-sectional areas, to releasably clamp the spindle, sleeve and housing together. By introducing a tapered key 80 into the aligned housing opening 81, spindle opening 82 and sleeve opening 83, relative rotation of the spindle and sleeve is eliminated as the housing is locked to the sleeve and spindle. Upon reciprocation of the table on which the apparatus is mounted, a flat surface may be ground on the tool. Suitable indexing of the housing may be achieved by providing circumferentially spaced openings in the sleeve to receive the key 80 thereby permitting a plurality of flat rectilinear surfaces to be ground on the punch. The entire housing may also be rotated about a vertical axis to the desired angle in the the stanchion 37 that is provided with a graduated tapered surface 84.

It will be readily apparent to those skilled in this art that various modifications may be made to the driving means for revolving the spindle upon table reciprocation without departing from the spirit and purpose of this invention and the use of mechanical equivalents for supporting the collet-chuck and rotating same is contemplated in the appended claims.

What is claimed is:

1. In combination with a motor-driven grinding wheel and a table supportable for horizontal reciprocation in juxtaposition to said grinding wheel, an apparatus mounted on said table for supporting and revolving a tool to be sharpened by said grinding wheel comprising a housing, a hollow spindle mounted to revolve in said housing, said spindle having circumferential indexing collar extending from the housing, a collet-chuck supporting sleeve slidably receivable in said spindle and concentric therewith, said sleeve having an indexing collar aligned with said spindle collar for indexing said sleeve, means for releasably locking said collars together whereby rotation of the spindle will rotate said sleeve, a collet-chuck and a collet-chuck locking means mounted on said sleeve for releasably locking a tool to be sharpened in said collet, and means for rotating said spindle and sleeve.

2. In combination with a motor-driven grinding wheel and a table supportable for horizontal reciprocation in juxtaposition to said grinding wheel, an apparatus mounted on said table for supporting and revolving a tool to be sharpened by said grinding wheel comprising a housing, a hollow spindle mounted to revolve in said housing, said spindle having a projecting collar having indicia thereon extending from the housing, a collet-chuck supporting sleeve axially and concentrically slidable in said spindle, said sleeve having a cooperating indexing collar for said spindle collar with indicia thereon for indexing said sleeve relative to said spindle, means for releasably locking said collars together, a collet-chuck and a collet-chuck locking means mounted on said sleeve for releasably locking a tool to be sharpened in said collet, and means for rotating said spindle and sleeve upon table reciprocation.

3. In combination with a motor-driven grinding wheel and a table supportable for horizontal reciprocation in juxtaposition to said grinding wheel, an apparatus mounted on said table for supporting and revolving a tool to be sharpened by said grinding wheel comprising a housing, a hollow spindle mounted to revolve in said housing, said spindle having a radially projecting circumferential flange extending from the housing, a collet-chuck supporting sleeve axially receivable in said spindle and concentric therewith, said sleeve having a cooperating flange aligned with said spindle flange for indexing said sleeve relative to the spindle flange, means for releasably locking said spindle and sleeve together, a collet-chuck and a collet-chuck locking means mounted on said sleeve for releasably locking a tool to be ground in said collet, including a gear train means for rotating said spindle and sleeve upon table reciprocation.

4. In combination with a motor-driven grinding wheel and a table supportable for horizontal reciprocation in juxtaposition to said grinding wheel, an apparatus mounted on said table for supporting and revolving a tool to be ground comprising a housing, a hollow spindle mounted to revolve in said housing, said spindle having an indexing collar, a collet-chuck supporting sleeve axially receivable in said spindle, said sleeve having a collar cooperating with said spindle collar, means for releasably clamping said spindle and sleeve together, a collet-chuck and a collet-chuck locking means mounted on said sleeve for releasably clamping a tool to be ground, and means including a gear train for rotating said spindle at a predetermined rate in accordance with the tool to be ground upon table reciprocation.

5. In combination with a motor-driven grinding wheel and a table supportable for horizontal reciprocation in juxtaposition to said grinding wheel, an apparatus mounted on said table for supporting and revolving a tool to be ground comprising a housing, a spindle mounted to revolve in said housing, said spindle having a collar, a collet-chuck supporting sleeve driven by said spindle, said sleeve having a collar cooperatively aligned with said spindle collar for indexing said sleeve, means for releasably clamping said spindle and sleeve together, a tool collet-chuck mounted on said sleeve for releasably locking a tool to be ground in said collet, and means for rotating said spindle and sleeve to generate a predetermined pitch corresponding to the tool to be ground upon table reciprocation.

6. In combination with a motor-driven grinding wheel and a table supportable for horizontal reciprocation in juxtaposition to said grinding wheel, an apparatus mounted on said table for supporting and revolving a tool to be sharpened by said grinding wheel comprising a housing, a hollow spindle mounted to revolve in said housing, said spindle having a radially projecting circumferential indexing collar extending from the housing, a collet-chuck supporting sleeve slidably received in said spindle and concentric therewith, said sleeve having a cooperating indexing collar aligned with said spindle collar for indexing said sleeve, means for releasably locking said collars together, a collet-chuck and a collet-chuck locking means mounted on said sleeve for releasably locking a tool to be sharpened in said collet, and means for rotating said spindle and sleeve upon table reciprocation, said means for rotating said spindle and sleeve upon table reciprocation including a rack mounted stationarily adjacent to said table and a cooperating pinion mounted to revolve said spindle for generation of a predetermined pitch corresponding to the pitch of the tool to be ground.

7. In combination with a motor-driven grinding wheel and a table supported for horizontal reciprocation in juxtaposition with said grinding wheel, a tool bit supporting apparatus, said apparatus having a housing supported on said table, a hollow spindle rotatably mounted in said housing, one end of said spindle having a collar with indicia thereon, a sleeve slidably receivable in said spindle, means releasably locking said sleeve and spindle preventing relative rotation therebetween, a collet-chuck for receiving a tool bit to be ground mounted in said sleeve, means on said collet-chuck for releasably locking a tool bit thereon, and means for rotating said spindle upon table reciprocation in accordance with the surface to be ground on the tool.

8. In combination with a motor-driven grinding wheel and a table supported for horizontal reciprocation in juxtaposition with said grinding wheel, a tool bit supporting apparatus, said apparatus having a housing supported on said table, a hollow spindle rotatably mounted in said housing, one end of said spindle having a flanged indexing head, a sleeve slidably receivable in said spindle, means releasably locking said sleeve and spindle preventing relative rotation therebetween, a collet-chuck for receiving a tool bit to be ground mounted in said sleeve, means on said collet-chuck for releasably locking a tool bit therein, and means for rotating said spindle upon table reciprocation in accordance with a predetermined angle corresponding to the surface to be ground.

References Cited in the file of this patent

UNITED STATES PATENTS

| 2,335,468 | Zwick | Nov. 30, 1943 |
| 2,452,089 | Wiken et al. | Oct. 26, 1948 |
| 2,672,714 | Wilson | Mar. 23, 1954 |
| 2,958,988 | Crosby | Nov. 8, 1960 |

OTHER REFERENCES

Serial No. 223,269, Zwick, (A.P.C.), published Apr. 27, 1943.